United States Patent Office 3,436,542
Patented Apr. 1, 1969

3,436,542
ELECTROMETER WITH AUTOMATIC DISCHARGE
Gilbert Ganouna-Cohen, Bagneux, Hauts-de-Seine, France, assignor to Commissariat à l'Energie Atomique, Paris, France
Filed June 21, 1966, Ser. No. 559,340
Claims priority, application France, Aug. 8, 1962, 906,479
Int. Cl. G01t 1/16
U.S. Cl. 250—83.6     3 Claims

ABSTRACT OF THE DISCLOSURE

An electrometer has a detector connected to a movable electrode. A stationary electrode is disposed adjacent the movable electrode. A masking member is mounted on the movable electrode and so arranged so that movement thereof causes variable masking of a radiation source to reduce the potential difference between the stationary electrode and the movable electrode after the electrodes have taken a predetermined positional relationship.

---

This application is a continuation of Ser. No. 299,218, which was filed on Aug. 1, 1963, and is now abandoned.

The present invention relates to electrometer systems.

Contact electrometers are already known for the measurement of small electrical charges liberated in a detector having a very high output impedance, such as an ionisation chamber, and they are constructed as shown in the diagram in FIGURE 1 of the accompanying drawings.

The electrometer shown in FIGURE 1 comprises two electrodes, one of which, 1, is movable while the other, 2, is stationary, the latter electrode being connected to the collector electrode 3 of the ionisation chamber while the movable electrode is connected to one of the poles of a voltage supply 4 through a resistor 5, the other end of the voltage supply being connected to the outer casing 6 of the inoisation chamber. Radiation acting on the ionisation chamber produces ions between the collector electrode 3 and the outer casing 6. Depending on their sign, these ions are collected by the electrode 3 or the casing 6 and contribute to a reduction of the potential difference between the collector electrode and the ionisation chamber casing. The potential difference between the movable electrode 1 and the stationary electrode 2 so increases that the sum of the potential difference between the said stationary and movable electrodes 1 and 2 on the one hand and the collector electrode 3 and the ionisation chamber casing 6 on the other hand are always equal to the potential difference of the supply 4. As the radiation acts on the ionisation chamber, the potential difference between the stationary electrode 2 and the movable electrode 1 increases, and when a certain amount of radiation has acted on the chamber said potential difference is sufficient to cause the movable electrode 1 to be attracted by the stationary electrode 2 so that they come into contact. When the two electrodes 1–2 are in contact the capacity that they form is discharged with a resultant short pulse at the terminals of the resistor 5.

Since the two electrodes 1–2 are then at the same potential, they should return to their initial state, but this is not the case, since a very small ionisation current continues to pass between the electrodes in contact with one another and keeps the movable electrode 1 attached to the stationary electrode 2.

To detach the movable electrode 1 from the stationary electrode 2 the retaining force must be opposed by a counteracting force which may, in particular, be delivered by a permanent magnet. In this latter case, in particular, the sensitivity of the electrometer is greatly reduced.

The main object of the present invention is to obviate the above disadvantages and to this end the invention contemplates an electrometer system for the measurement of small electrical charges liberated in a detector having a very high output impedance, such as an ionisation chamber, of the type comprising a stationary electrode, a movable electrode, and a device sensitive to the movement of the movable electrode in which a member connected to the movable electrode is arranged to effect variable masking of a radiation source forming part of said device and means is provided for reducing the potential difference between the stationary electrode and the movable electrode as soon as said device has detected a given positional relationship between the two electrodes.

The various features and advantages of the invention will be apparent from the following description of some exemplary embodiments thereof illustrated in the accompanying drawings wherein.

Figure 1:
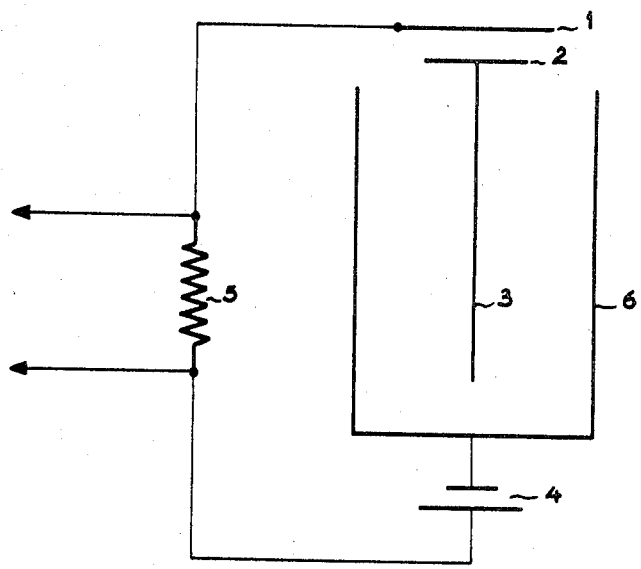
Figure 7:
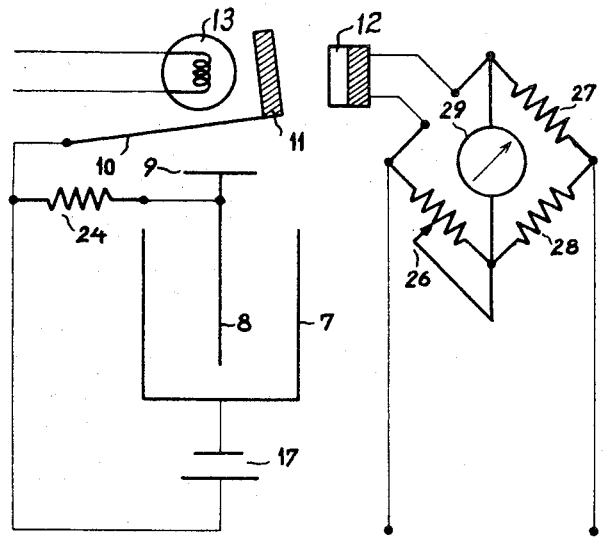

Finally, FIGURE 7 is a circuit diagram of a fifth embodiment of an electrometer according to the invention applicable more particularly to the measurement of radiation intensities.

Figure 2:
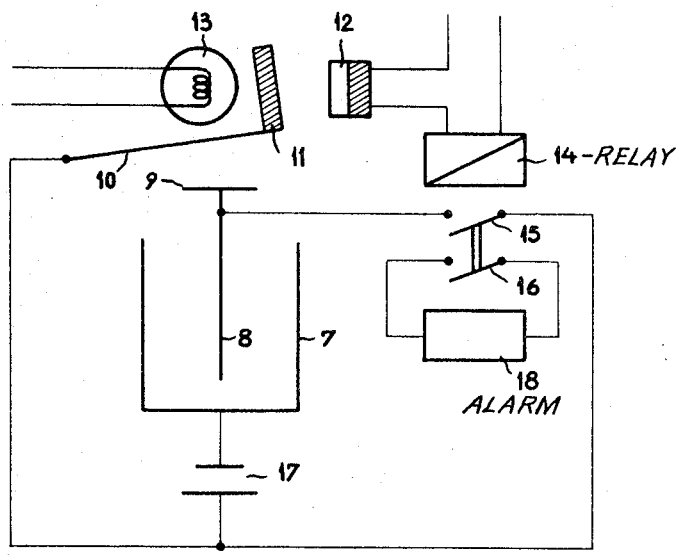
FIGURE 2 is a circuit diagram of a first embodiment of an electrometer according to the invention.

According to the invention, the contact electrometer shown in FIGURE 2 is intended particularly for dose counting and co-operates with an ionisation chamber subject to radiation and comprising an outer casing 7 and a collector electrode 8. Of course, the electrometer shown in FIGURE 2 may be used with another detector having a very high output impedance, instead of an ionisation chamber. In the application shown in FIGURE 2, the potential difference between the outer casing 7 of the ionisation chamber and the collector electrode 8 decreases, while it increases between the stationary electrode 9 and the movable electrode 10 when the ionisation chamber is subject to radiation.

The electrometer also comprises a photosensitive element 12 and a light source 13 so disposed that it can be at least partially masked by a flap 11 connected to the movable electrode 10 and disposed—as shown in FIGURE 2—between the light source and the photosensitive element. In the embodiment shown in FIGURE 2 and in the embodiments to be discussed hereinafter either a photosensitive element and a light source or a radioactive source and a meter will be used, but these systems could be replaced by the application of any physical phenomenon and a detector for the same so disposed as to perform the same task, namely the control of a relay 14, which will be mentioned hereinafter.

In the absence of any charges between the stationary electrode 9 and the movable electode 10 the flap 11 masks the photosensitive element 12. As soon as some charges appear between the stationary and movable electrodes 9 and 10, the attraction of the latter by the former moves the flap 11 and for a given movement the photosensitive element 12 (which may in particular be provided with an optical system) receives enough light from the light source 13 to act on a relay 14 either directly or through an amplifier. This relay 14 controls at least one contact 15 disposed in a circuit connected on the one hand to the stationary electrode 9 and on the other hand to the pole of the voltage supply 17 to which the movable electrode 10 is directly connected. Closure of the switch 15 brings the potential of the electrode 9 to the same value as the electrode 10, all the voltage of the supply 17 being between the casing 7 and the ionisation chamber collector electrode 8. The system is then returned to its initial state because as soon as the potentials of the movable and stationary electrodes 9 and 10 are equal the movable electrode 10 moves away from the stationary electrode and the flap 11 again masks the photo-sensitive element 12. The relay 14 then frees the switch 15. Preferably, and as shown in FIGURE 2, a second switch 16 is also controlled by the relay 14 and controls either a metering device 18 or an alarm or similar device.

In the photoelectrometer circuit shown in FIGURES 3 to 7 like references have been used to denote like elements in FIGURE 2.

Figure 3:
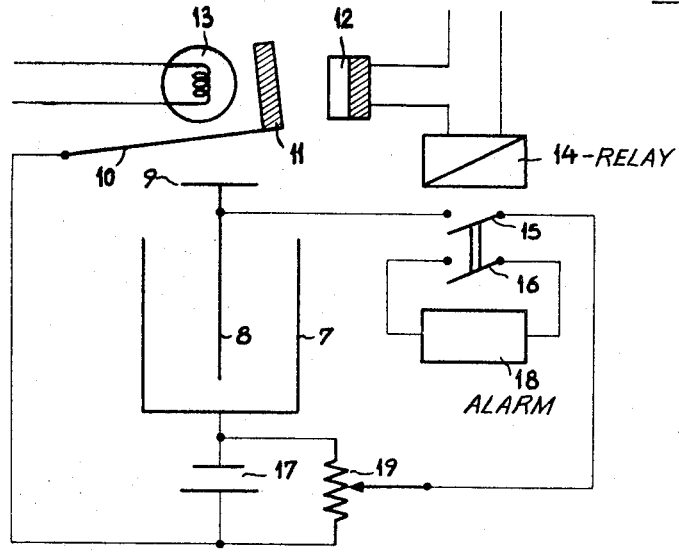
FIGURE 3 is a circuit diagram of a second embodiment of an electrometer according to the invention wherein the potential of the stationary electrode is brought to an intermediate potential by means of a potentiometer.

The circuit diagram in FIGURE 3 shows how it is possible to bring the potential of the stationary electrode 9 to an intermediate potential between that of the outer casing 7 of the ionisation chamber and that of the movable electrode 10, thus greatly increasing the instrument sensitivity. To this end, a potentiometer 19 is used, whose winding is connected in parallel to the voltage supply 17. The intermediate potential obtained on the stationary electrode 19 is selected to correspond to the de-energisation of the relay 14.

Figure 4:
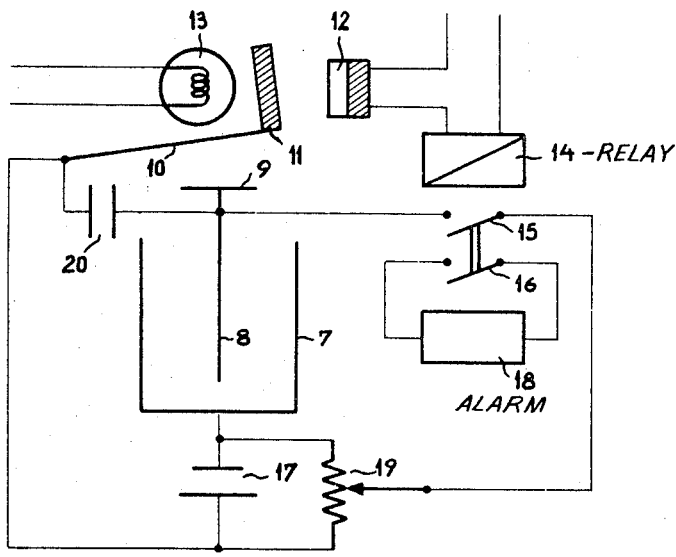
FIGURE 4 is a circuit diagram of a variant of the electrometer shown in FIGURE 3.

In some cases it is desirable to reduce the sensitivity of the instrument and then, as shown in the variant in FIGURE 4, at least one fixed capacity 20 is connected between the stationary electrode 9 and the movable electrode 10, said capacity drawing a certain quantity of charges which are discharged when the switch 15 is operated by the relay 14.

If it is desired to actuate an alarm system, an additional self-holding contact may be provided on the relay 14 in order to maintain the said alarm.

Figure 5:
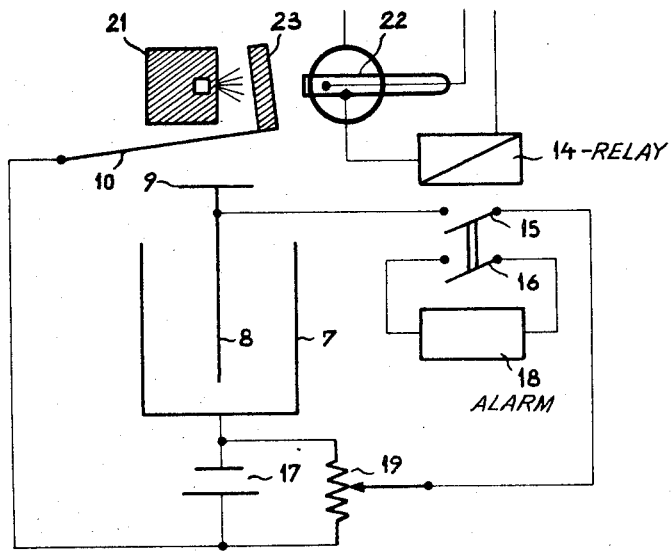
FIGURE 5 is a circuit diagram of a third embodiment of the electrometer according to the invention similar to that shown in FIGURE 3 but in which a radioactive source and a meter are used instead of a light source and a photosensitive element.

In the circuit shown in FIGURE 5, the device sensitive to the movements of the movable electrode 10 is a radioactive source 21 and a meter 22 between which a screen 23 connected to the movable electrode 10 moves. The circuit in FIGURE 5 provides pulses corresponding to a given charge liberated in the ionisation chamber. Allowing for the chamber volume, this charge may be reduced to a radiation dose. Each pulse therefore corresponds to a given dose per cc. of gas in the chamber. All the liberated charges are collected on the electrodes 9 and 10, the only leakages being due to the quality of the insulator used.

Figure 6:
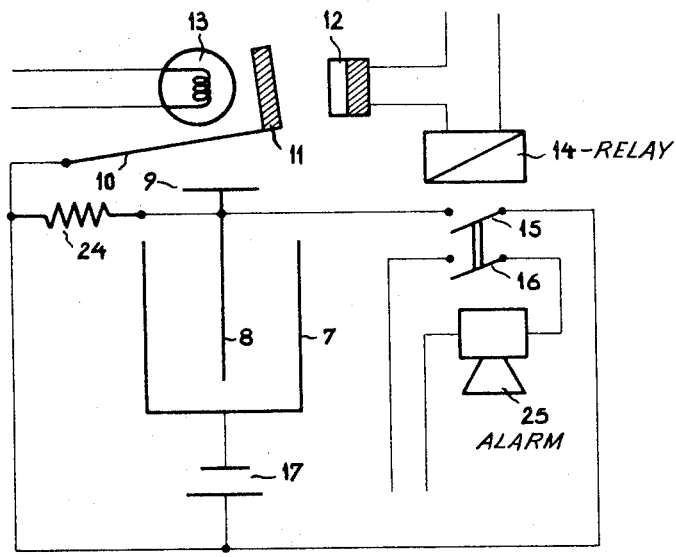
FIGURE 6 is a circuit diagram of a fourth embodiment of the electrometer according to the invention wherein the movable electrode and the stationary electrode are shunted by a resistor of a given value.

The circuit diagram in FIGURE 6 illustrates an example of application of the contact electrometer to a special case in which only a single alarm pulse is required for example (as in the case of criticality detectors).

In this embodiment, apart from the common elements already described hereinbefore, the circuit comprises a resistor 24 of known value connected between the electrodes 9 and 10 of the electrometer. The charge measured by the electrometer corresponds to the product of its capacity and the voltage at the terminals of the resistor 24, this voltage being due to the passage of the ionisation current through the said resistor 24. The deflection of the movable electrode 10 is therefore a function of the voltage at the terminals of the resistor 24 of the ionisation current. In the absence of any radiation this deflection is zero. The value of the various elements of the circuit may be so determined as to produce a tripping action by the photosensitive element 12 (or by a radioactivity counter), this tripping action corresponding to a given value of the radiation intensity below which no alarm is given by a device 25 disposed in the circuit controlled by the switch 16, the latter being controlled by the relay 14.

Finally, the circuit shown in FIGURE 7 is an example of application of the electrometer to the measurement of radiation intensities. As in the case of a criticality detector (FIGURE 6), a high-value leakage resistor 24 is connected between the stationary and movable electrodes 9 and 10. The movable electrode will be deflected to varying amounts according to the radiation intensity to which the ionisation chamber 7–8 is subjected. The photosensitive element 12 is thus unmasked progressively and the position of the movable electrode 10 in relation to the stationary electrode 9 and hence the voltage at the terminals of the resistor 24 as a result of the passage of ionisation current through said resistor can be determined by the low impedance meter 29 through the agency of a measuring bridge formed by the photosensitive element 12 and the elements 26, 27 and 28. In some cases the instrument response may be required to be logarithmic; the photosenstive element used may then have a logarithmic resistance variation for the linearly illuminated zone.

I claim:

1. An electrometer system for the measurement of small electrical charges liberated in a detector having a very high output impedance including an ionization chamber, a fixed electrode connected to the collector electrode of the ionization chamber, a movable electrode connected to one of the poles of a voltage source, means connecting the other pole of the voltage source to the shell of the ionization chamber, a source of radiation different from the source of electrical charges, a screen secured to the movable electrode substantially masking the radiation from said source of radiation, a receiver separate from said detector for this radiation and a relay controlled by said receiver, said relay controlling at least one switch connected in a circuit connecting the stationary electrode to the movable electrode for reducing the potential difference between the electrodes as soon as a given positional relationship between the electrodes is detected.

2. An electrometer system according to claim 1 wherein the stationary electrode is connected to the collector electrode of the ionization chamber and also to a pole of a potential source, to which the movable electrode is connected, over a circuit comprising a potentiometer for bringing the potential of the stationary electrode to a potential midway between that of the movable electrode and that of the other pole of said source which is connected to the detector casing.

3. An electrometer system according to claim 1 in which the stationary and movable electrodes are connected by a circuit comprising at least one fixed capacity arranged to be discharged through a switch in a circuit connecting the stationary electrode to one pole of a potential source to which the movable electrode is also connected.

References Cited

UNITED STATES PATENTS

| | | | |
|---|---|---|---|
| 2,794,955 | 6/1957 | Rich | 324—109 |
| 3,082,328 | 3/1963 | Möhring | 250—83.6 |
| 3,123,714 | 3/1964 | Chope | 250—83.6 |

ARCHIE R. BORCHELT, *Primary Examiner.*

U.S. Cl. X.R.

324—109